United States Patent
Pearse et al.

(10) Patent No.: US 11,294,068 B2
(45) Date of Patent: Apr. 5, 2022

(54) RF SIGNAL SYSTEM OUTPUTS CALIBRATION

(71) Applicant: Spirent Communications, PLC

(72) Inventors: Neil Christopher Pearse, Ashburton (GB); Mark Geoffrey Holbrow, Paignton (GB)

(73) Assignee: Spirent Communications, PLC, Crawley (GB)

(*) Notice: Subject to any disclaimer, the term of this patent is extended or adjusted under 35 U.S.C. 154(b) by 513 days.

(21) Appl. No.: 16/176,972

(22) Filed: Oct. 31, 2018

(65) Prior Publication Data
US 2020/0132856 A1    Apr. 30, 2020

(51) Int. Cl.
*G01S 19/23*    (2010.01)
*H04B 17/21*    (2015.01)
*G01S 19/25*    (2010.01)
*H04B 17/11*    (2015.01)

(52) U.S. Cl.
CPC ............ *G01S 19/235* (2013.01); *G01S 19/25* (2013.01); *H04B 17/11* (2015.01); *H04B 17/21* (2015.01)

(58) Field of Classification Search
CPC .... H04B 17/11; H04B 17/12; H04B 17/0085; G01S 19/23–235
See application file for complete search history.

(56) References Cited

U.S. PATENT DOCUMENTS 9,473,258 B2    10/2016    Pearse et al.
9,880,284 B2    1/2018    Pearse et al.
(Continued)

FOREIGN PATENT DOCUMENTS

GB    2524340 B    2/2016
JP    2008249649 A    10/2008
(Continued)

OTHER PUBLICATIONS

Digital modulation. (1999). Focal Dictionary of Telecommunications, Focal Press. Routledge. Credo Reference: https://search.credoreference.com/content/entry/bhfidt/digital_modulation/0 (Year: 1999).*

(Continued)

*Primary Examiner* — Bernarr E Gregory
*Assistant Examiner* — Fred H Mull
(74) *Attorney, Agent, or Firm* — Haynes Beffel & Wolfeld, LLP; Ernest J. Beffel, Jr.

(57) ABSTRACT

A method is provided for calibrating a test platform including a plurality of system outputs to align RF signals generated by the system outputs. RF power of a combined RF signal is detected, where the combined RF signal is from a reference RF signal generated by a reference system output in the plurality of system outputs and a test RF signal generated by a test system output in the plurality of systems outputs. A phase of the test RF signal is iteratively shifted relative to the reference RF signal until the detected RF power reaches a minimum. The test RF signal is inverted to be in-phase with the reference RF signal when the combined RF power reaches the minimum. A system is also provided (Continued)

for calibrating a test platform including a plurality of system outputs to align RF signals generated by the system outputs.

12 Claims, 4 Drawing Sheets

(56) References Cited

U.S. PATENT DOCUMENTS

| | | |
|---|---|---|
| 2002/0094014 A1* | 7/2002 | Kim .................. H04B 17/318 375/130 |
| 2004/0240581 A1 | 12/2004 | Salapski |
| 2006/0047842 A1 | 3/2006 | McElwain |
| 2008/0075216 A1 | 3/2008 | Li et al. |
| 2011/0257923 A1 | 10/2011 | Boulton |
| 2011/0279147 A1 | 11/2011 | Montalvo et al. |
| 2013/0202068 A1 | 8/2013 | Ly-Gagnon et al. |
| 2014/0218240 A1 | 8/2014 | Kpodzo et al. |
| 2014/0225773 A1 | 8/2014 | Boulton |
| 2015/0229417 A1 | 8/2015 | Reed et al. |
| 2019/0319722 A1* | 10/2019 | Yu ......................... H04B 17/14 |

FOREIGN PATENT DOCUMENTS

| | | |
|---|---|---|
| WO | 9614697 A1 | 5/1996 |
| WO | 2005109028 A1 | 11/2005 |

OTHER PUBLICATIONS

A.N. Kulkarni, A Compact Multiband Antenna with MIMO Implementation for USB Size 4G LTE Wireless Devices, IEEE International Symposium on Antennas and Propagation (APSURSI), p. 2215-2218, 2011 (Year: 2011).*

GB 1821053.4—First Office Action dated Jun. 19, 2019, 6 pages.

Spirent Technical Data Pamphlet: GSS9000 Constellation Simulator; MCD00210 Issue 1-01 Apr. 2014; published Apr. 4, 2014; downloaded Feb. 6, 2015 datasheet athttp://www.spirent.com/.about./media/Datasheets/positioning/GSS9000.pdf.

Borre et al., "GNSS Receivers, One Step Deeper", Danish GPS Center, Aalborg, Denmark, 2013, consisting of 42 pages.

GB 1821053.4—Response to First Office Action dated Jun. 19, 2019, 19 pages.

* cited by examiner

RF SIGNAL SYSTEM OUTPUTS CALIBRATION

FIELD OF THE INVENTION

The present invention relates to a test platform for testing radio frequency signals as present in a global navigation satellite system, and more particularly to techniques for aligning RF signals of system outputs in a test platform.

DESCRIPTION OF RELATED ART

Global Navigation Satellite System (GNSS) simulators are test tools that are able to create Radio Frequency (RF) signals that are practically indistinguishable from the signals that would be received from an actual constellation of moving earth-orbiting navigation satellites at a given location, date and time.

Simulators create the effects of a time-delayed signal representing the transit time of the signal transmission from a satellite thousands of kilometers away from the receiver with appropriate signal level. The simulator can superimpose many real-world effects such as dispersion of the signal due to the electrically-charged Ionosphere leading to signal timing delay and the effects of reception antenna gain and phase variation as a function of arrival angle at the antenna. Other effects can include effects of multi-paths, ionospheric delay, tropospheric delay, terrain obscuration, antenna patterns (gain and phase), and results of interference simulation.

On state-of-the-art GNSS simulators virtually all of these real-world degradations are under the control of the user via a software control interface to a series of mathematical models. On such simulators the time alignment between individual signal components within and between constellation types is necessary to ensure that simulated signals are as representative of those from actual satellites as possible.

Current techniques for alignment of RF signals from system outputs across GNSS carriers and constellations, and also across channel banks and antennas include manual, time consuming processes which require external test equipment and a degree of invasive measurement. Coupled with these issues, the level of measurement uncertainty introduced by the current techniques significantly adds to the total error budget. Current techniques can restrict opportunities for user system reconfiguration and in-field upgrades.

It is desirable to provide a method and device that can automate the initial and post in-field calibration of a GNSS simulator that supports in-field upgrade with the flexibility to change GNSS constellation type/frequency on a scenario-by-scenario basis.

SUMMARY

A method is provided for calibrating a test platform including a plurality of system outputs to align RF signals generated by the system outputs. RF power of a combined RF signal is detected, where the combined RF signal is from a reference RF signal generated by a reference system output in the plurality of system outputs and a test RF signal generated by a test system output in the plurality of systems outputs. A phase of the test RF signal is iteratively shifted relative to the reference RF signal until the detected RF power reaches a minimum. The test RF signal is inverted to be in-phase with the reference RF signal when the combined RF power reaches the minimum.

The method can include generating a reference digital carrier signal at a first carrier frequency, converting the reference digital carrier signal into the reference RF signal, generating a test digital carrier signal at the first carrier frequency, and converting the test digital carrier signal into the test RF signal. The method can include rerunning the method by applying a second carrier frequency different than the first carrier frequency to the reference digital carrier generator and the test digital carrier generator.

Detecting the RF power of a combined RF signal can include combining the reference RF signal and the test RF signal to generate the combined RF signal, converting the combined RF signal into a digital signal indicating the detected RF power, and determining a phase shift in the test RF signal relative to the test RF signal using the digital signal.

The method can be rerun with respective test RF signals generated by other test system outputs in the plurality of systems outputs.

A system for calibrating a test platform including a plurality of system outputs to align RF signals generated by the system outputs is provided. The system comprises a detector to detect RF power of a combined RF signal from a reference RF signal generated by a reference system output in the plurality of system outputs and a test RF signal generated by a test system output in the plurality of systems outputs. The system comprises control logic including logic to iteratively shift a phase of the test RF signal relative to the reference RF signal until the detected RF power reaches a minimum, and invert the test RF signal to be in-phase with the reference RF signal when the combined RF power reaches the minimum.

The system comprises a reference digital carrier generator to generate a reference digital carrier signal at a first carrier frequency, and a reference RF converter to convert the reference digital carrier signal into the reference RF signal. The system comprises a test digital carrier generator to generate a test digital carrier signal at the first carrier frequency, and a test RF converter to convert the test digital carrier signal into the test RF signal. In one embodiment, the reference digital carrier generator, the reference RF converter, the test digital carrier generator, and the test RF converter are implemented on a single integrated circuit chip or a multichip module under one package. Furthermore, the control logic can be implemented on the same single integrated circuit chip or the same multichip module under one package.

The control logic includes rerunning the logic by applying a second carrier frequency different than the first carrier frequency to the reference digital carrier generator and the test digital carrier generator.

The detector includes a combiner to combine the reference RF signal and the test RF signal to generate the combined RF signal, and a RF converter to convert the combined RF signal into a digital signal indicating the detected RF power.

The control logic includes rerunning the logic with respective test RF signals generated by other test system outputs in the plurality of systems outputs.

Other aspects and advantages of the present invention can be seen on review of the drawings, the detailed description and the claims, which follow.

DETAILED DESCRIPTION

A detailed description of implementations of the technology disclosed is provided with reference to the figures. The following description will typically be with reference to specific structural implementations and methods. It is to be understood that there is no intention to limit the invention to the specifically disclosed implementations and methods but that the invention may be practiced using other features, elements, methods and implementations. Preferred implementations are described to illustrate the present invention, not to limit its scope, which is defined by the claims. Those of ordinary skill in the art will recognize a variety of equivalent variations on the description that follows.

Global Navigation Satellite System (GNSS) simulators, such as the GSS9000 GNSS Simulator manufactured by Spirent Communications plc, can support the flexibility to change GNSS constellation type/frequency on a scenario-by-scenario basis. The system also could accept in-field upgrade through the addition of channel banks and enabling of additional signal types on existing channel banks. However, these options cannot reasonably be implemented without an improvement in calibration procedures. Without an improvement, the multiple calibration measurements needed would render in-field upgrade calibration time impractical.

Figure 1:
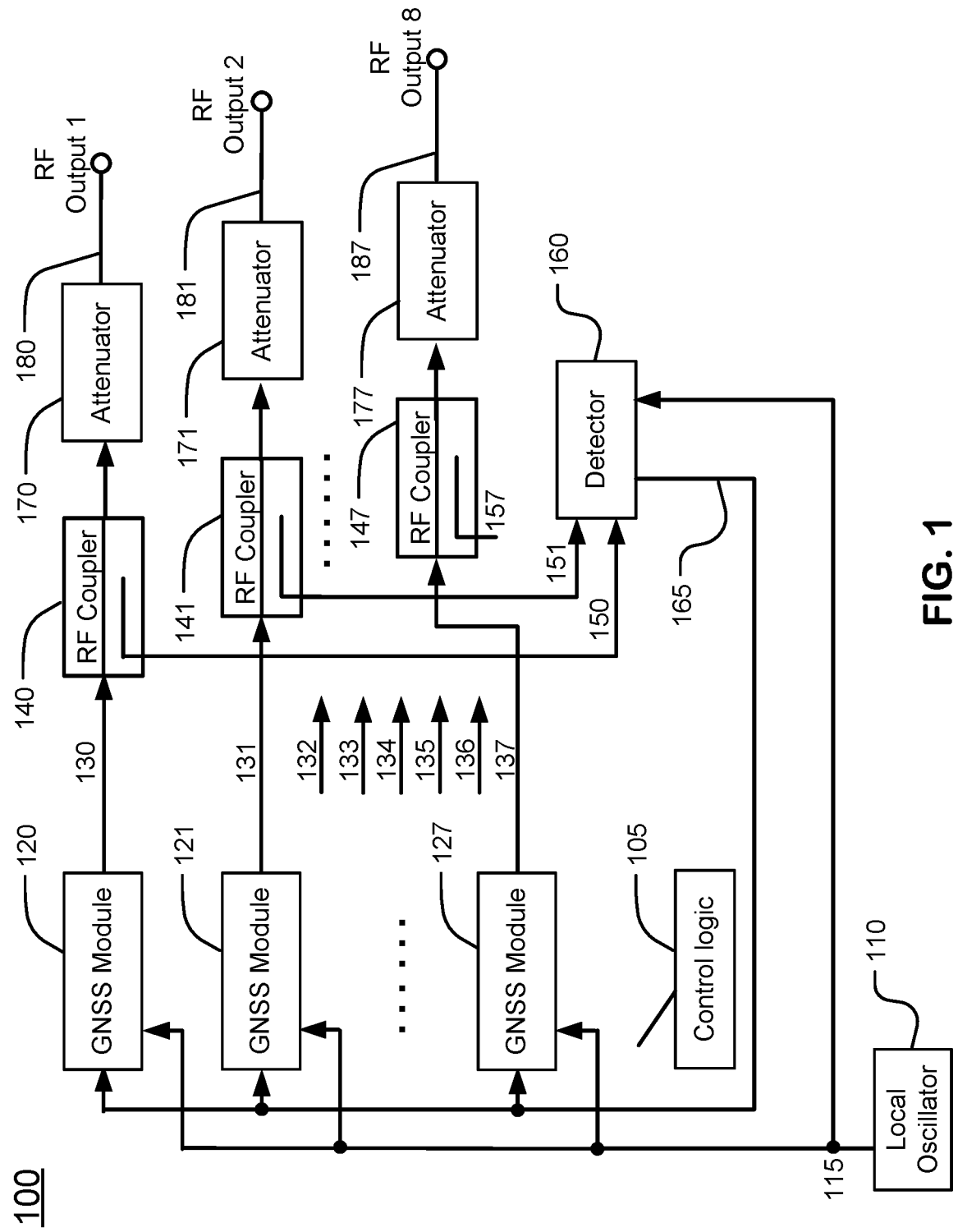
FIG. 1 is a simplified diagram illustrating a test platform including a plurality of system outputs to align RF signals generated by the system outputs.

FIG. 1 is a simplified diagram illustrating a test platform 100 including a plurality of system outputs to align a plurality of RF signals (130-137) generated by the system outputs. The test platform includes a local oscillator 110 to generate a system clock 115. The test platform 100 includes a plurality of system outputs provided by a plurality of GNSS modules (e.g. 120, 121, . . . 127). The GNSS modules can receive the system clock 115, and generate respective RF signals 130-137 on the system outputs. The test platform includes a detector 160 that can receive the system clock 115, and detect RF power of a combined RF signal from a reference RF signal (e.g. 130) generated by a reference system output in the plurality of system outputs and a test RF signal (e.g. 131) generated by a test system output in the plurality of systems outputs. Any one of the RF signals 130-137 can be used as a reference RF signal to align a test RF signal from among other RF signals with the reference RF signal. Although FIG. 1 illustrates 8 RF signals generated by the system outputs from respective GNSS modules, the test platform can be configured with a different number of RF signals.

The detector 160 can generate a signal 165 indicating the detected RF power of a combined RF signal (315, FIG. 3) from a reference RF signal (150) generated by a reference system output and a test RF signal (151) generated by a test system output. The GNSS modules 120, 121, . . . 127 can receive the signal 165.

The test platform includes control logic 105 including logic to iteratively shift a phase of the test RF signal relative to the reference RF signal until the detected RF power reaches a minimum, and invert the test RF signal to be in-phase (0 degree) with the reference RF signal when the combined RF power reaches the minimum. The detected RF power can reach a minimum when the reference RF signal and the test RF signal are 180 degrees out of phase. The reference RF signal and the test RF signal are in-phase when they are 0 degree out of phase. The control logic can be implemented in integrated circuits including FPGAs (Field Programmable Gate Arrays) or CPUs (Central Processing Unit).

Control logic 105 can include logic to rerun the logic by applying a second carrier frequency different than the first carrier frequency to the reference digital carrier generator and the test digital carrier generator. Table 1 illustrates center frequencies in MHz for a combination of constellation/carrier combinations (i.e. signal types). For instance, the first carrier frequency can be constellation type GPS and carrier L1 with the center frequency of 1575.42 MHz, while the second carrier frequency can be constellation type GPS and carrier L2 with the center frequency of 1227.6 MHz.

TABLE 1

| Signal Type | Center frequency (MHz) |
|---|---|
| GPS L1 | 1575.42 |
| Galileo E1 | |
| GPS L2 | 1227.6 |
| GPS L5 | 1176.45 |
| GLONASS L5 | |
| Galileo E5ab | 1191.795 |
| Galileo E6 | 1278.75 |
| GLONASS F1 F0 | 1602.00 |
| GLONASS F2 F0 | 1246.00 |
| BeiDou B1 | 1561.098 |
| BeiDou B2 | 1207.14 |
| BeiDou B3 | 1268.52 |

Control logic 105 can include logic to rerun the logic with respective test RF signals (e.g. 132-137) generated by other test system outputs in the plurality of systems outputs in the test platform 100.

The test platform includes a plurality of RF couplers (e.g. 140, 141, . . . 147) corresponding to the plurality of RF signals (130-137). A first coupler (e.g. 140) can couple a reference RF signal (e.g. 130) to a first input of the detector 160 via a signal 150, and a second coupler (e.g. 141) can couple a test RF signal (e.g. 131) to a second input of the detector 160 via a signal 151. In another example, a different coupler (e.g. 147) can couple a different test RF signal (e.g. 137) to the second input of the detector 160 via a signal 157.

The test platform includes a plurality of attenuators (170, 171, . . . 177) attenuating the plurality of RF signals (130-137) via the respective RF couplers (140, 141, . . . 147) to produce respective attenuated RF signals (180, 181, . . . 187) to respective RF outputs (1, 2, . . . 8).

Figure 2:
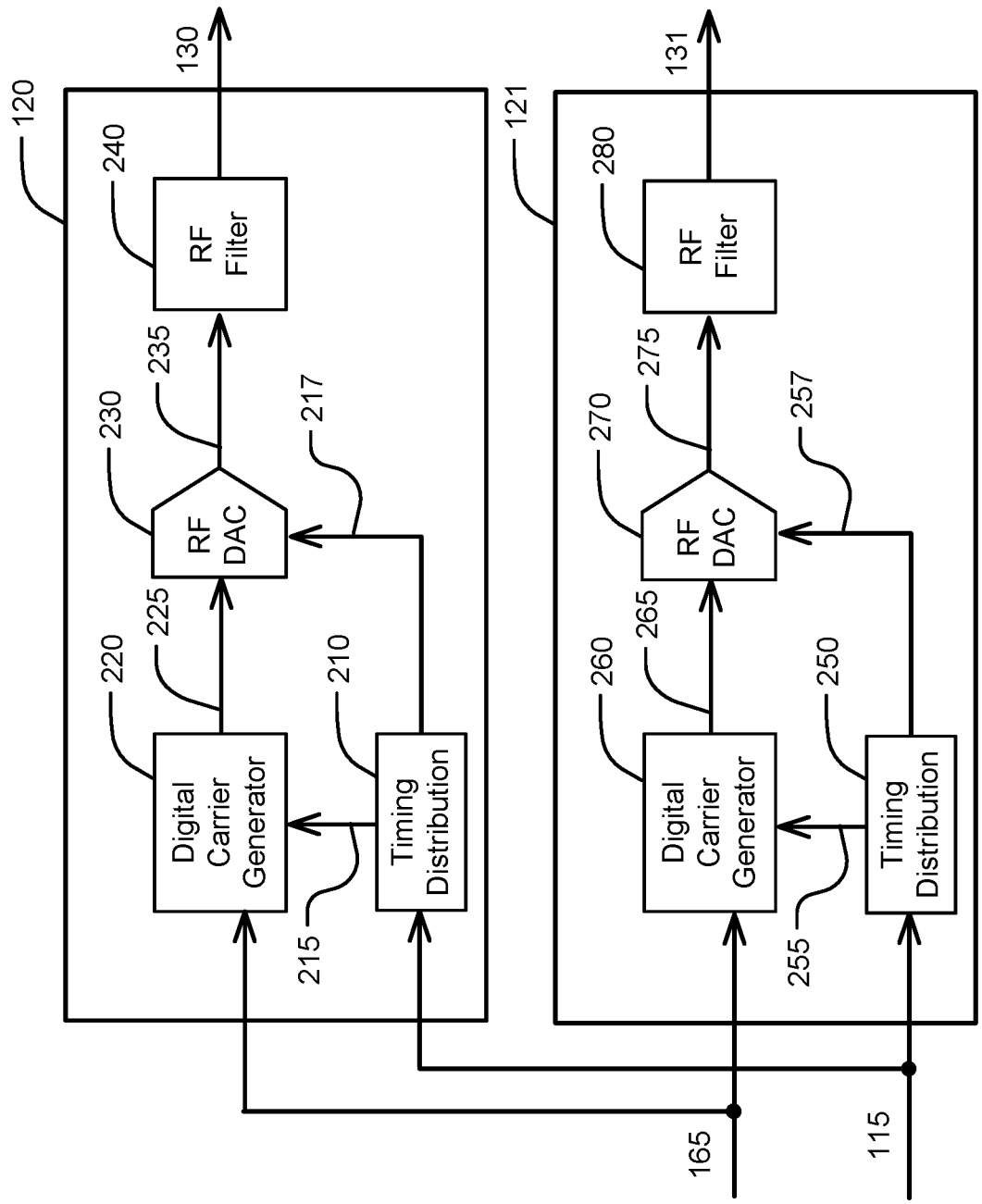
FIG. 2 illustrates the GNSS modules in a system for calibrating a test platform as shown in FIG. 1.

FIG. 2 illustrates the GNSS modules in a system for calibrating a test platform as shown in FIG. 1. A GNSS module (e.g. 120, 121) can include timing distribution circuitry (e.g. 210, 250) that can receive the system clock 115, and generate a carrier clock signal (e.g. 215, 255) for a digital carrier generator (220, 260) and a sample clock signal (e.g. 217, 257) for a RF converter (230, 270), such as a RF DAC (radio frequency digital-to-analog converter). For instance, a carrier clock signal 215 can be at a carrier frequency 1575.42 MHz (Mega hertz), and a sample clock signal 217 can be at a carrier sample rate 6 Gsps (Giga samples per second).

A first GNSS module 120 can include a reference digital carrier generator 220 that can generate a reference digital carrier signal 225, using numerically controlled oscillators and a sine/cosine lookup table in an integrated circuit chip, such as a field programmable gate array (FPGA). In the reference digital carrier generator 220, an initial digital carrier signal can be generated at a sample rate of 120 Msps for example. The initial digital carrier signal is then interpolated to 6 Gsps (Giga samples per second) for the reference digital carrier signal 225. The frequency of the reference digital carrier signal 225 is tuned by selecting controlling numbers for the numerically controlled oscillators, and selecting interpolating factors for the interpolating process. A reference RF converter 230 can upconvert the reference digital carrier signal 225 into a first RF signal 235. The reference RF converter 230 can be a RF DAC (radio frequency digital-to-analog converter). A first RF filter 240 can filter the first RF signal 235 to produce the reference RF signal 130. The RF filter can be a band pass filter that allows a range of frequencies such as 1145-1625 MHz. This filter can reject out-of-band spurious signals and harmonics from the first RF signal 235, for example.

A second GNSS module 121 can include a test digital carrier generator 260 that can generate a test digital carrier signal 265 at the carrier frequency on the carrier clock signal 255. A test RF converter 270 can convert the test digital carrier signal 265 into a second RF signal 275. The test RF converter 270 can be a RF DAC (radio frequency digital-to-analog converter). A second RF filter 280 can filter the second RF signal 275 to produce the test RF signal 131. The RF filter can be a band pass filter that allows a range of frequencies such as 1145-1625 MHz. This filter can reject out-of-band spurious signals and harmonics from the second RF signal 275, for example.

The first GNSS module 120 and the second GNSS module 121 can receive data received on the digital signal 325 (FIG. 3) and transmitted to the GNSS modules by the receiver 330 (FIG. 3) via the signal 165. The data can indicate the detected RF power of a combined RF signal (315, FIG. 3) from a reference RF signal (150, FIGS. 1 and 3) generated by a reference system output and a test RF signal (151, FIGS. 1 and 3) generated by a test system output.

A first sample clock signal 217 provided to the reference RF converter 230 in the first GNSS module 120 and a second sample clock signal 257 provided to the test RF converter 270 in the second GNSS module 121 have the same sample frequency. However, the exact phase of the sample clock signals (e.g. 217, 257) at the reference and test RF converters cannot be guaranteed due to manufacturing process variations and temperature. Not only may the sample clock phase of a sample clock signal (e.g. 217, 257) vary between the different RF converters (e.g. 230, 270) in the test platform 100, but the digital data on a digital carrier signal may not be synchronized. For instance, the reference digital carrier signal 225 provided to the reference RF converter 230 is upconverted by the reference RF converter 230 and placed onto the sample clock signal 217 with an error of +/−1 carrier clock (6 Gsps). Other factors may also affect the carrier phase such as the PCB (printed circuit board) layout and the design of RF Filters (e.g. 240, 280) in addition to manufacturing variations.

This problem with the phase of the sample clock signals and the phase of the digital carrier signals can be solved by the method and system as described herein. RF signals generated by the system outputs in the test platform can be aligned automatically at startup of the test platform with no action by the user.

In one implementation, components in the test platform 100 including the timing distribution circuitry (e.g. 210, 250, FIG. 2), the digital carrier generators (e.g. 220, 260, FIG. 2), and the RF DAC converters (e.g. 230, 270, FIG. 2) as described herein can be implemented on a single integrated circuit chip, such as ZU25DR RF SoC, a field programmable gate array (FPGA) manufactured by Xilinx Inc. The control logic (105, FIG. 1) in the test platform 100 can also be implemented in the same single integrated circuit chip. Alternatively, such components including the control logic in the system can be implemented on a multichip module under one package. Implementing such components in the system on a single integrated circuit chip or on a multichip module under one package can reduce the temperature sensitivity of the components in the system.

Figure 3:
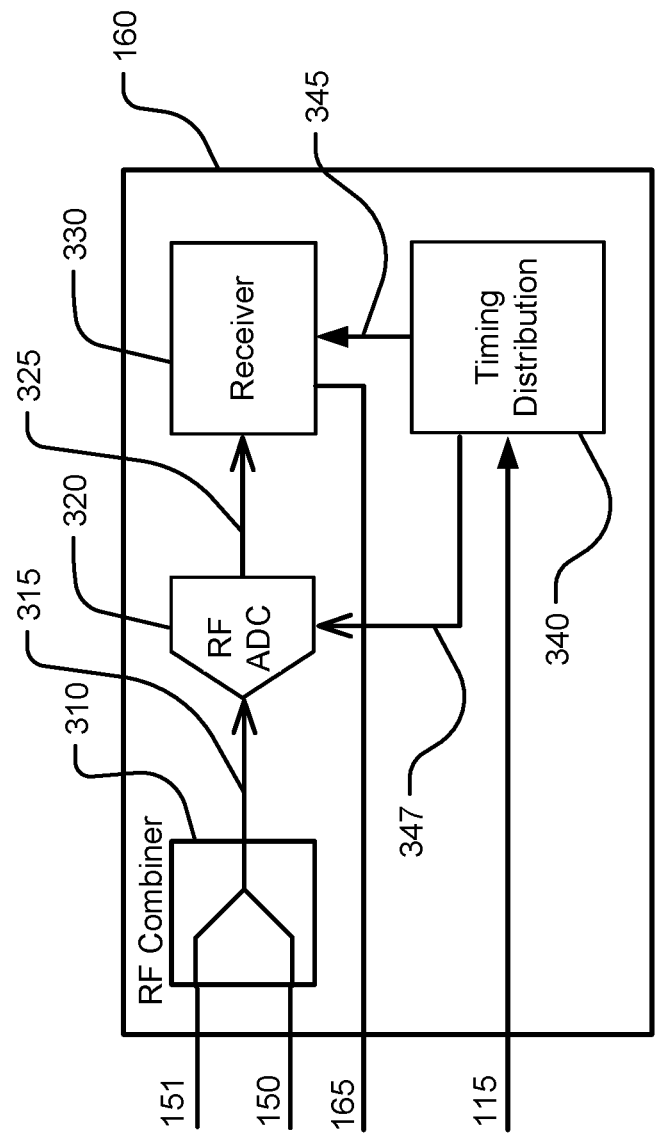
FIG. 3 illustrates a detector in a system for calibrating a test platform as shown in FIG. 1.

FIG. 3 illustrates a detector in a system for calibrating a test platform as shown in FIG. 1. A detector 160 can include a RF combiner 310 to combine a reference RF signal 150 and a test RF signal 151 to generate a combined RF signal 315, and a RF converter 320 to convert the combined RF signal 315 into a digital signal 325 indicating the detected RF power. The RF converter 320 can be a RF DAC (radio frequency analog-to-digital converter). The RF combiner 310 can be coupled to each of the RF signals generated by the system outputs from the GNSS modules. To calibrate a particular RF signal (e.g. 151) with a reference RF signal (e.g. 150), all other RF signals (e.g. 157) are decoupled from the RF combiner 310.

The detector 160 can include a receiver 330 to receive the digital signal 325, and transmit data received on the digital signal 325 to the GNSS modules 120, 121, . . . 127 (FIG. 1) via a signal 165. For instance, a communication protocol such as PCI Express can be used for the signal 165.

The detector 160 can include timing distribution circuitry 340 that can receive the system clock 115, and generate a clock signal 345 for the receiver 330 and a carrier clock signal 347 for the RF converter 320. For instance, the clock signal 345 can be at a frequency 240 MHz, and the carrier clock signal 347 can be at a carrier frequency 1575.42 MHz, which is downconverted by the RF converter 320 to 240 Msps for example.

The control logic (105, FIG. 1) can include logic to determine a phase shift in the test RF signal 151 relative to the test RF signal 150 using the digital signal 325. The digital signal 325 indicates the detected RF power of a combined RF signal 315 from a reference RF signal 150 and a test RF signal 151, is received from the RF converter 320, and is transmitted to the GNSS modules by the receiver 330 via the signal 165.

Figure 4:
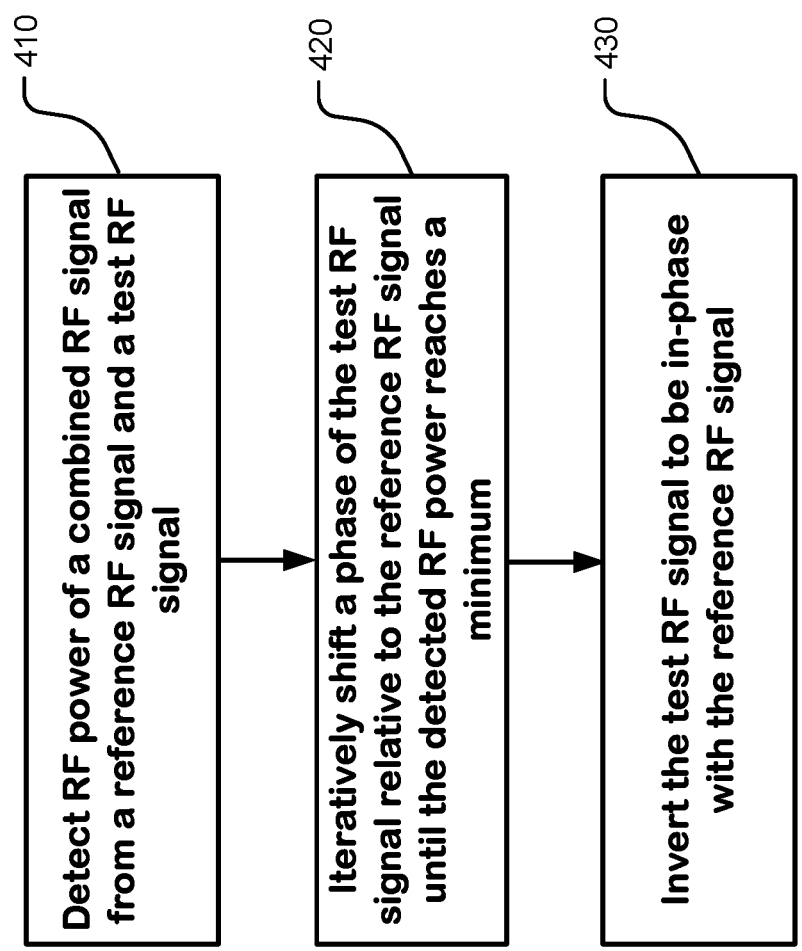
FIG. 4 is a flow diagram of a method for calibrating a test platform including a plurality of system outputs to align RF signals generated by the system outputs.

FIG. 4 is a flow diagram of a method for calibrating a test platform including a plurality of system outputs to align RF signals generated by the system outputs.

At Step 410, RF power of a combined RF signal is detected, where the combined RF signal is from a reference RF signal generated by a reference system output in the plurality of system outputs and a test RF signal generated by a test system output in the plurality of systems outputs.

Step 410 can include generating a reference digital carrier signal at a first carrier frequency, and converting the reference digital carrier signal into the reference RF signal, as further described in reference to FIG. 2. Step 410 can include generating a test digital carrier signal at the first carrier frequency, and converting the test digital carrier signal into the test RF signal, as further described in reference to FIG. 2.

Step 410 can include rerunning the method by applying a second carrier frequency different than the first carrier frequency to the reference digital carrier generator and the test digital carrier generator, as further described in reference to FIG. 1 and Table 1.

At Step 420, a phase of the test RF signal relative to the reference RF signal is iteratively shifted until the detected RF power reaches a minimum, i.e., when the reference and test RF signals are 180 degrees out of phase.

Step 420 can include combining the reference RF signal and the test RF signal to generate the combined RF signal, converting the combined RF signal into a digital signal indicating the detected RF power, and determining a phase shift in the test RF signal relative to the test RF signal using the digital signal, as further described in reference to FIG. 3.

At Step 430, the test RF signal is inverted to be in-phase (i.e. 0 degree) with the reference RF signal when the combined RF power reaches the minimum.

Steps 410, 420 and 430 can be rerun with respective test RF signals generated by other test system outputs in the plurality of systems outputs.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of calibrating a test platform including a plurality of system outputs to align RF signals generated by the system outputs, comprising:
   detecting RF power of a combined RF signal from a reference RF signal generated by a reference system output in the plurality of system outputs and a test RF signal generated by a test system output in the plurality of systems outputs, wherein the reference system and the test system are separate systems; and
   iteratively shifting a phase of the test RF signal relative to the reference RF signal until the detected RF power reaches a minimum; and
   inverting the test RF signal to be in-phase with the reference RF signal when the combined RF power reaches the minimum.

2. The method of claim 1, comprising:
   generating a reference digital carrier signal at a first carrier frequency;
   converting the reference digital carrier signal into the reference RF signal;
   generating a test digital carrier signal at the first carrier frequency; and
   converting the test digital carrier signal into the test RF signal.

3. The method of claim 2, comprising:
   rerunning the method by applying a second carrier frequency different than the first carrier frequency when generating the reference digital carrier and when generating the test digital carrier.

4. The method of claim 1, said detecting comprising:
   combining the reference RF signal and the test RF signal to generate the combined RF signal;
   converting the combined RF signal into a digital signal indicating the detected RF power; and
   determining a phase shift in the test RF signal relative to the reference RF signal using the digital signal.

5. The method of claim 1, comprising:
   rerunning the method with respective test RF signals generated by other test system outputs in the plurality of systems outputs.

6. A system for calibrating a test platform including a plurality of system outputs to align RF signals generated by the system outputs, comprising:
   a detector to detect RF power of a combined RF signal from a reference RF signal generated by a reference system output in the plurality of system outputs and a test RF signal generated by a test system output in the plurality of systems outputs, wherein the reference system and the test system are separate systems; and
   control logic including logic to iteratively shift a phase of the test RF signal relative to the reference RF signal until the detected RF power reaches a minimum, and invert the test RF signal to be in-phase with the reference RF signal when the combined RF power reaches the minimum.

7. The system of claim 6, further comprising:
   a reference digital carrier generator to generate a reference digital carrier signal at a first carrier frequency;
   a reference RF converter to convert the reference digital carrier signal into the reference RF signal;
   a test digital carrier generator to generate a test digital carrier signal at the first carrier frequency; and
   a test RF converter to convert the test digital carrier signal into the test RF signal.

8. The system of claim 7, the control logic including:
   rerunning the logic by applying a second carrier frequency different than the first carrier frequency to the reference digital carrier generator and the test digital carrier generator.

9. The system of claim 7, wherein the reference digital carrier generator, the reference RF converter, the test digital carrier generator, and the test RF converter are implemented on a single integrated circuit chip or a multichip module under one package.

10. The system of claim 9, wherein the control logic is implemented on the same single integrated circuit chip or the same multichip module under one package.

11. The system of claim 6,
    the detector including a combiner to combine the reference RF signal and the test RF signal to generate the combined RF signal, and a RF converter to convert the combined RF signal into a digital signal indicating the detected RF power; and
    the control logic including logic to determine a phase shift in the reference RF signal relative to the test RF signal using the digital signal.

12. The system of claim 6, the control logic including:
    rerunning the logic with respective test RF signals generated by other test system outputs in the plurality of systems outputs.

* * * * *